United States Patent [19]
Weaver

[11] Patent Number: 6,098,348
[45] Date of Patent: Aug. 8, 2000

[54] ADAPTABLE SQUIRREL SHIELD

[76] Inventor: Dennis Weaver, 8240 Mitchell Mill Rd., Ooltewah, Tenn. 37636

[21] Appl. No.: 09/263,419

[22] Filed: Mar. 5, 1999

[51] Int. Cl.$^7$ .................................................. A01K 39/01
[52] U.S. Cl. ..................... 52/101; 52/741.3; 52/745.13; 119/52.3; 119/57.9
[58] Field of Search .................... 47/23; 52/101, 52/170, 741.3, 745.13; 119/52.3, 57.9, 856; 403/3, 4, 263

[56] References Cited

U.S. PATENT DOCUMENTS

| | | | |
|---|---|---|---|
| 104,418 | 6/1870 | Brunson | 43/23 |
| D. 174,139 | 3/1955 | Sadler . | |
| 219,987 | 9/1879 | Scott | 43/23 |
| 389,047 | 9/1888 | Birht | 43/23 |
| 2,891,508 | 6/1959 | Bower . | |
| 3,768,441 | 10/1973 | Laham . | |
| 5,347,769 | 9/1994 | Dinsmore . | |
| 5,355,835 | 10/1994 | Freed . | |
| 5,570,652 | 11/1996 | Ferland . | |
| 5,642,687 | 7/1997 | Nylen . | |
| 5,826,542 | 10/1998 | Allen . | |

*Primary Examiner*—Christopher T. Kent
*Attorney, Agent, or Firm*—Technoprop Colton LLC

[57] ABSTRACT

An adjustable shield installed on a pole or tree to prevent squirrels and other animals from climbing beyond the assembled shield when the shield is wrapped around the pole or tree, including a conical member extending outward from the pole or tree, wherein the shield provides no convenient surface upon which the animal can grasp to continue upward the pole or tree, an inner and outer edge, two side edges and a center assembly made up of a plurality of projections or fingers.

20 Claims, 4 Drawing Sheets

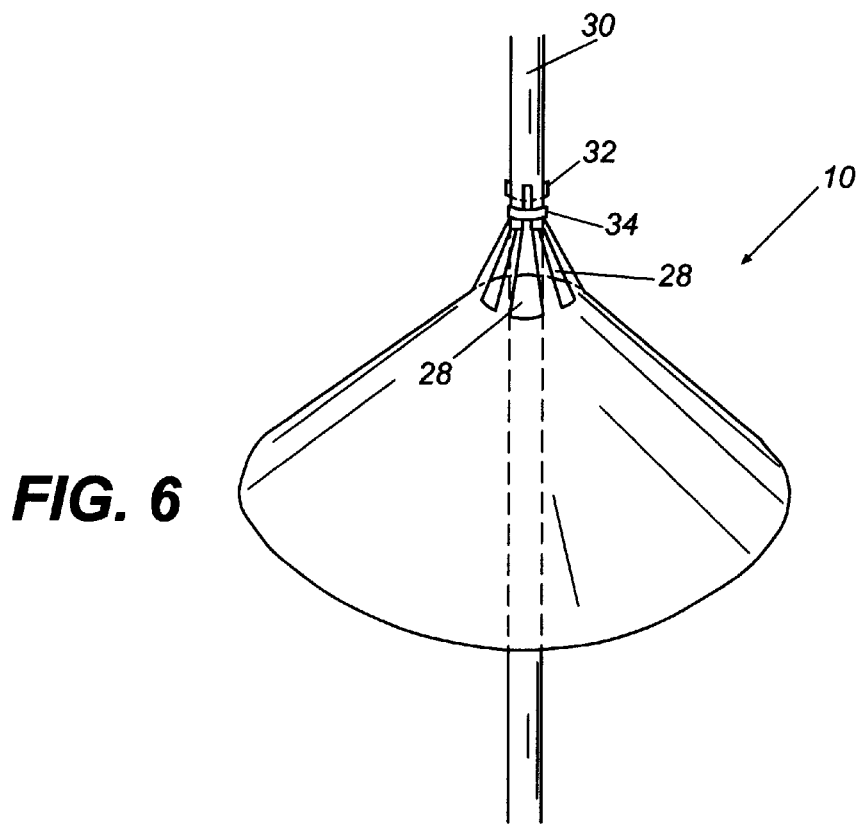
FIG. 6
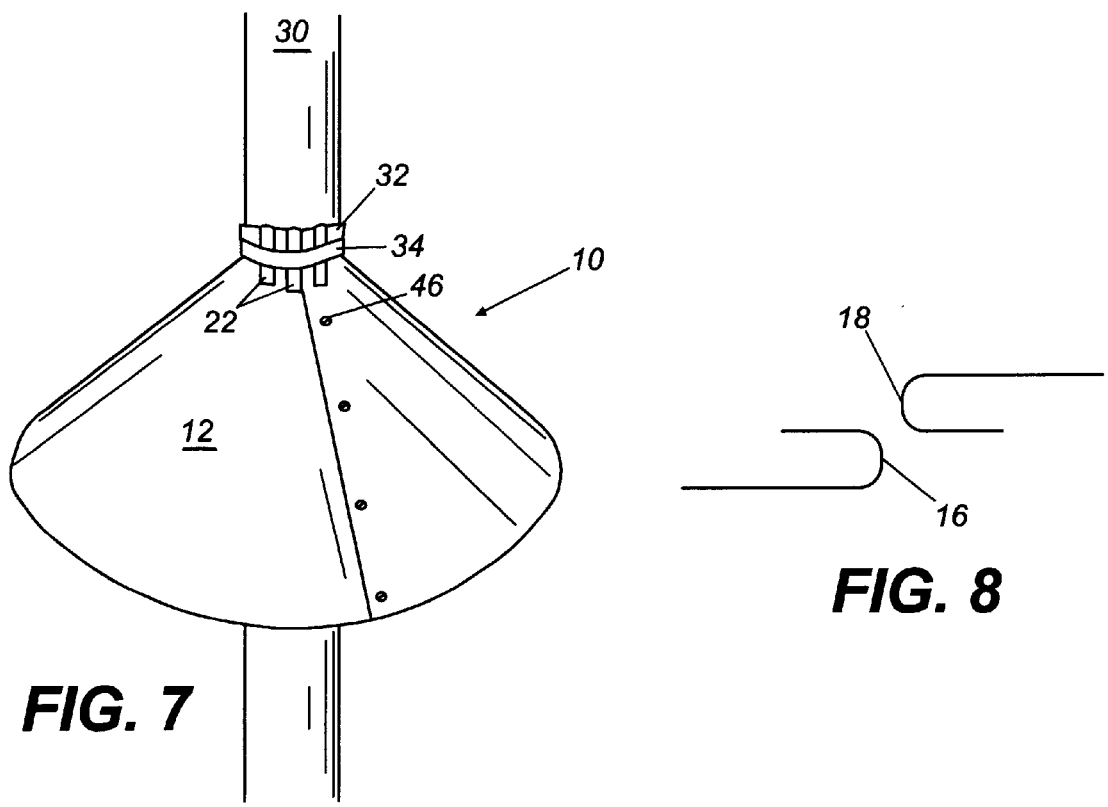
FIG. 7
FIG. 8

ADAPTABLE SQUIRREL SHIELD

BACKGROUND OF THE INVENTION

1. Field of the Invention

The present invention relates generally to a marauder guard, and more specifically to an adjustable squirrel shield to prevent squirrels and other animals from climbing bird feeder poles and the like.

2. Description of the Related Art

Bird feeders not only provide birds with a readily available food source during the colder months, but also provide an enjoyable pastime for bird watchers. Typically when birds feed from a birdfeeder, feed becomes dislodged from the bottom of the feeder and falls to the ground. This ground feed attracts other birds and land animals including squirrels, chipmunks, raccoons and cats. It does not take long for these animals to relate the dropped bird feed with the raised bird feeder. If the bird feeder is mounted atop a post, squirrels and the like can easily scamper up the pole in order to reach the bird feeder.

What is often a relaxing and enjoyable pastime can become frustrating when a squirrel reaches the feeder and begins to eat the food. First, a single squirrel can eat much more food than even a number of birds, which means the feeder quickly can become empty. The owner of the bird feeder then must frequently refill the feeder with bird food in order to once again attract the birds and ensure that the birds have a sufficient amount of food. Second, this frequent replacement of bird food can become costly and inconvenient. Third, a squirrel eating from a bird feeder scares off the birds, thus defeating the owner's purpose of having the feeder. Lastly, particular bird feeders and poles may not be designed to withstand the extra weight of a perched squirrel, and thus may become damaged or broken under the additional weight.

Many bird feeders are mounted a considerable distance above ground level at the top end of a long upright post or pole having its lower ends buried in the ground. These pole-mounted bird feeders are prone to invasion of the marauding animals, who are able to climb up the long pole to the bird feeder located at the top and steal the food. Attempts at keeping squirrels off of these types of bird feeders commonly have failed since squirrels are by nature extremely agile and cunning animals. Strategies at keeping animals away from feeders include altering the post the bird feeder sits atop making it slippery and thereby more difficult for squirrels to climb. Yet, the squirrels often still are able to overcome this obstacle, and reach the bird feeder.

Other devices have been proposed over the years to resolve animal problems by preventing the marauder from climbing completely to the top of the pole and bird feeder. For example, U.S. Pat. No. 2,891,508 to Bower, R. H. discloses a marauder guard comprising an annular plate having a center hole. The marauder guard is slipped under the pole holding the bird feeder, which pole extends through the hole. The guard is then supported on the pole below the bird feeder by a spring. The device is capable of inclined movement upon animal contact, returning to a nearly perpendicular plane to the pole upon animal release.

U.S. Pat. No. D174,139 to Sadler discloses an ornamental design for a bird feeding station incorporating a barrier located beneath the bird feeder. The barrier appears to slope downward from the pole of the bird feeding station.

U.S. Pat. No. 5,355,835 to Freed discloses another bird feeder having a platform slide subassembly. The subassembly includes an annular platform fixedly attached to a sleeve. The sleeve is slidable over the pole, extended coaxially with the pole. The platform subassembly is designed to slide down the pole when engaged by an animal attempting to climb the pole and reach the bird feeder. The bird feeder further comprises a biasing subassembly to raise the platform assembly vertically along the pole to a position in proximity to the bird feeder when the animal that had engaged the platform subassembly releases the platform subassembly.

U.S. Pat. No. 5,642,687 to Nylen et al. discloses a squirrel baffler comprising a one-piece body and a bracket assembly. The squirrel baffler is constructed by placing it around a pole above the bracket assembly and then pushing edges inwardly and sliding interlocking members together so as to engage open-ended channels of each interlocking member. The squirrel baffler is then slid into placed downward on pole until it rests securely on top of the bracket assembly.

U.S. Pat. No. 3,768,441 to Laham discloses an animal repelling device comprising two sections rotatably connected together by a connector hole and a rivet. When the sections are closed, a central opening is formed capable of accepting a drain pipe and the like therethrough. The sections are fastened together by a wire tied around angular catch members, which are adjacent to each other when the sections are in closed positions. Further, the device comprises flanges bordering the opening and extending downwardly therefrom.

U.S. Pat. No. 5,347,769 to Dinsmore discloses a guard device to protect highway signs from graffiti. The guard device comprises two generally identical guard members. The guard members are placed on opposite sides of sign post and then brought together to encircle the post. When brought together, the two sections have an aperture in the center of the generally circular guard through which the sign post passes through. When the two sections are fixedly attached to one another, the guard members will deform into a slightly conical shape.

U.S. Pat. No. 5,570,652 to Ferland discloses a rodent guard for use on cables, wires and the like. The rodent guard comprises a sleeve adapted to encircle the wire. The sleeve is attached to a disk having a radial slit extending from its center to its edge, and having a central hole adapted so as to hold the barrier disk in a plane at all times substantially traverse to the tubular sleeve. The slit is secured against opening by plastic tie bands.

While rodent baffles designed to be placed on poles to deter squirrels and other animals from reaching an elevated bird house (or from ascending any type of pole, such as deck supports, clothesline supports, vegetable garden plant supports, for example) are known in the art, there remains a need for an adaptable animal shield such that a single unit can be used to prevent squirrels and the like from ascending poles or trees of varying diameters, and one that can be installed by the owner in a minimum amount of time. Further, there is a need for an adaptable squirrel shield that has a low production cost and is lightweight and durable through changing weather conditions and cycles. It is to the provision of such a squirrel shield that the present invention is primarily directed.

SUMMARY OF THE INVENTION

Briefly described, in its preferred form, the present invention is an adjustable squirrel shield to prevent squirrels and other animals from climbing poles or trees. The squirrel shield preferably comprises a sheet of flexible material which is between a quarter-circle and a half-circle in size. The shield comprises an inner and outer edge, two side edges and a center assembly between the two side edges and extending from the inner edge. Preferably, the center assembly is made up of a plurality of projections or fingers.

The shield is designed to be wrapped around a pole such that a portion of the fingers of the center assembly are held in contact with the pole while the assembled shield slopes downward and outward from the pole from the fingers to the outer edge, thus providing a conical barrier against climbing marauders.

Accordingly, it is a principal object of the present invention to provide a squirrel shield device that easily can adjust for varying pole or tree diameters and be releasably secured thereto.

It is another object of the present invention to provide a squirrel shield that is inexpensive to produce and easy to install.

These and other objects, features and advantages of the present invention will become more apparent upon reading the following specification in conjunction with the accompanying drawing figures.

BRIEF DESCRIPTION OF THE FIGURES

FIG. 6 is an illustration of the shield of FIG. 5 secured to the pole by a second strap.

FIG. 7 is the shield of FIG. 3 shown secured to the pole by a first and second strap.

FIG. 8 is a side view of another embodiment of the side edges of the present squirrel shield.

DETAILED DESCRIPTION OF A PREFERRED EMBODIMENT

Figure 1:
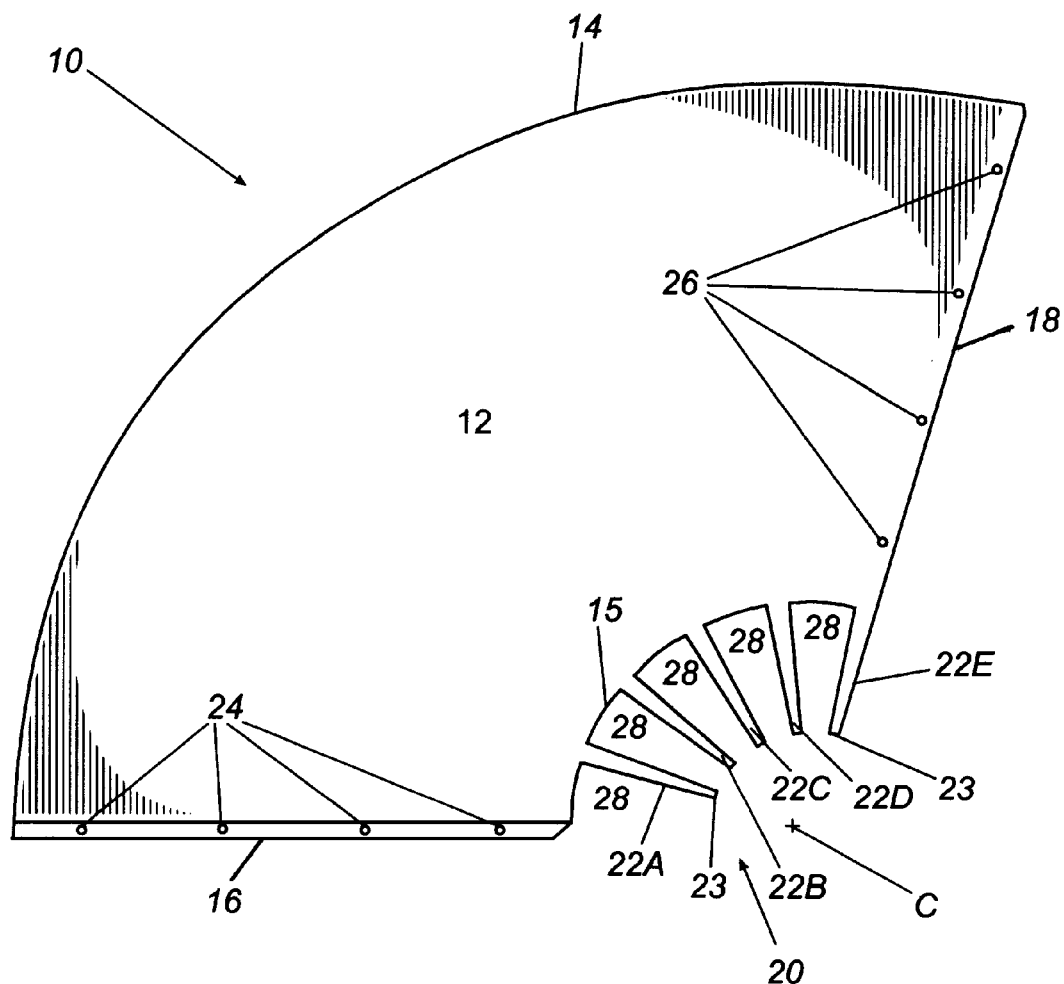
FIG. 1 illustrates a top view of an unassembled squirrel shield according to a preferred embodiment of the present invention.

Referring now in detail to the drawing figures, wherein like reference numerals represent like parts throughout the several views, FIG. 1 illustrates an unassembled adjustable squirrel shield according to a preferred embodiment of the present invention. The squirrel shield 10 preferably comprises a sheet of flexible material 12 having an outer edge 14, an inner edge 15, two side edges 16, 18 and a center assembly 20 between the two side edges 16, 18 and extending inward from inner edge 15, wherein center assembly 20 incorporates a plurality of fingers 22 projecting inward from inner edge 15. Although FIG. 1 illustrates squirrel shield 10 having outer and inner edges 14, 15 with constant radii of curvature, and two side edges 16, 18 normal to edges 14, 15, it should be noted that outer and inner edges 14, 15, and side edges 16, 18 need not be so configured to provide a marauder guard as will become apparent upon description of the assembled shield 10.

The squirrel shield 10 preferably comprises a flat sheet material 12 having an outer and inner surface and shaped between a quarter-circle and a half-circle. With the shield 10 assembled, the outer surface of shield 10 encounters the weather (faces generally upward and outward), while the inner surface faces the pole or tree upon which shield 10 is secured (faces generally downward and inward). Unassembled shields 10 easily and cost effectively can be shipped and stored in flat, stacked arrangements. Sheet material 12 can comprise metals, plastics or the like, wherein the sheet 12 preferably will not rust or materially deteriorate due to the weather. Sheet 12 also can be painted to suite a variety of needs, including blending in the shield 10 with the pole or tree.

Sheet 12 further incorporates holes 24 in proximity to side edge 16, and holes 26 in proximity to side edge 18. Holes 24, 26 are designed such that fastening devices can be slipped therethrough upon assembling shield 10, wherein holes 24 are aligned either over or under holes 26. While holes 24, 26 need not be aligned in straight rows as shown in FIG. 1, each hole 24 must correspond to a complimentary hole 26 upon assembly.

Center assembly 20 comprises fingers 22 separated by cutouts 28. Fingers 22 are formed by removing portions of sheet 12 that would exist should side edges 16 and 18 extend to meet at point C, and were sheet 12 integral throughout. Point C is the center of the circles that incorporate the arcs of outer edge 14 and inner edge 15. Preferably, fingers 22 extend out from inner edge 15 to tips 23 of fingers 22, and are integral with sheet material 12. Alternatively, fingers 22 can be constructed from a separate material than of sheet 12 that provides even better resilience and bending characteristics than does the construction of the sheet 12. Fingers 22 require such features so they do not snap or otherwise fail when shield 10 is installed around the pole. As shown in FIG. 1, shield 10 can comprise five fingers 22a, 22b, 22c, 22d, 22e spaced apart from each other in regular intervals by cutouts 28, although the design, number and periodicity of the placement of fingers 22 in center assembly 20 can be altered while maintaining the underlying principals of the present invention.

Figure 2:
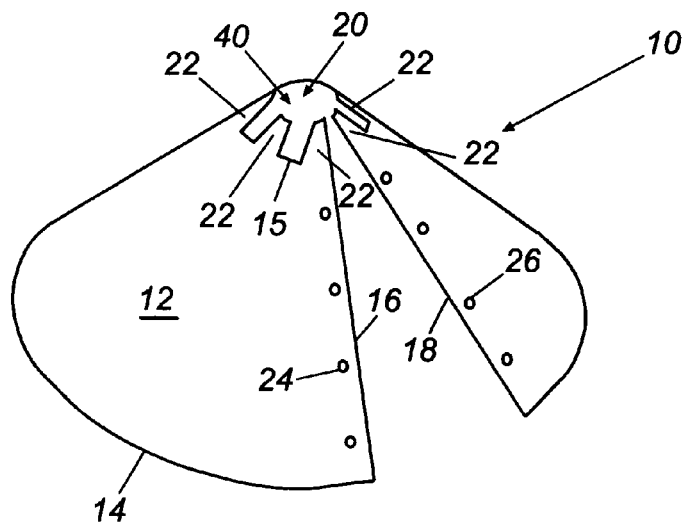
FIG. 2 shows the squirrel shield of FIG. 1, in a partially assembled configuration.

FIG. 2 illustrates shield 10 in a partially assembled form. To begin assembly of shield 10, edges 16 and 18 are brought in proximity to each other. As edges 16, 18 are drawn together, sheet 12 naturally forms a conical shape widening from center assembly 20 to outer edge 14. As center assembly 20 takes shape, it is apparent from FIG. 2 that the pole or tree can slip through the generally circular aperture 40 defined at the termination of fingers 22 at tips 23 of center assembly 20. The diameter of aperture 40 is smaller than the diameter of a circle incorporating inner edge 15. As edges 16 and 18 are overlaid, holes 24 and 26 align so that fastening means may be placed through holes 24 and 26 to secure the assembled configuration of shield 10. The fastening means can comprise nut and bolt assembly screws, plastic ties and the like.

Figure 3:
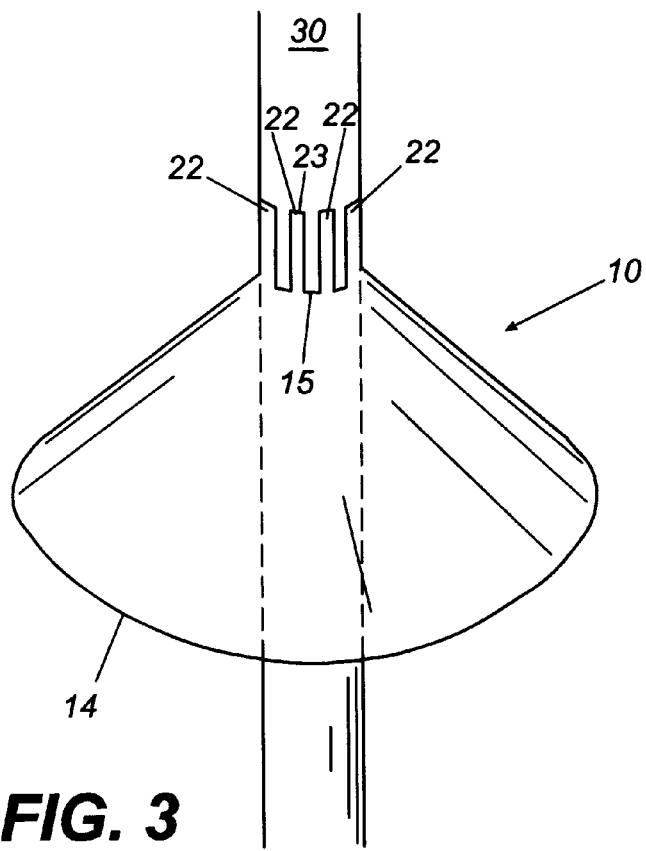
FIG. 3 shows the squirrel shield according to a preferred form of the present invention wrapped around a pole.

The present shield 10 is adaptable for varying diameters of poles or trees. FIG. 3 illustrates an initial step in installing shield 10 around pole 30. To wrap shield 10 around pole 30, a portion of the inner surface of fingers 22 are made to contact pole 30, and extend upward pole 30, while edges 16, 18 are brought together. Pole 30 of FIG. 3 depicts the largest diameter pole 30 that can be accommodated by shield 10. Shield 10 is designed to adapt to a variety of diameters because of its unique center assembly 20 design. Upon assembly, the diameter of shield 10 as defined by its outer edge 14 remains constant regardless of pole diameter since the holes 24, 26 align upon wrapping shield 10 around pole 30. Further, the diameter of the circle defined by inner edge 15 is similarly constant. Thus, the adjustability of the present invention lies in the unique design of center assembly 20. Since fingers 22 are bendable along their length from inner edge 15 to tip 23, the largest diameter pole that shield 10 can accommodate has a diameter equal to the diameter of the circle of inner edge 15 of shield 10. This configuration is shown in FIG. 3. As illustrated, the inner surface of the entire length of each finger 22 contacts the outer surface of pole 30.

Figure 4:
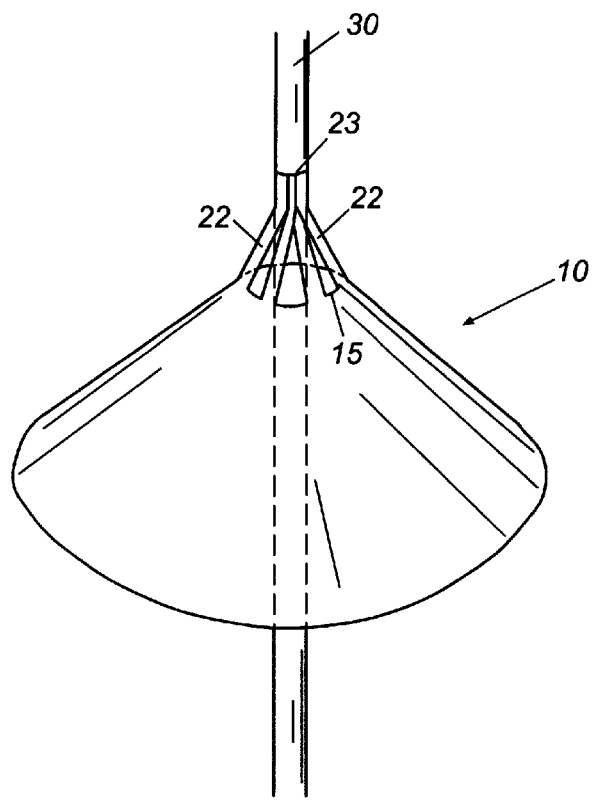
FIG. 4 illustrates the squirrel shield of FIG. 3 wrapped around a thinner pole.

FIG. 4 illustrates a pole 30 that has both a smaller diameter than the pole of FIG. 3 and than inner edge 15 of shield 10. Thus, portions of fingers 22 contact pole 30, those portions being in proximity to tips 23. Center assembly 20 therefore provides shield 10 with the ability to accommodate poles 30 with a wide range of diameters.

Figure 5:
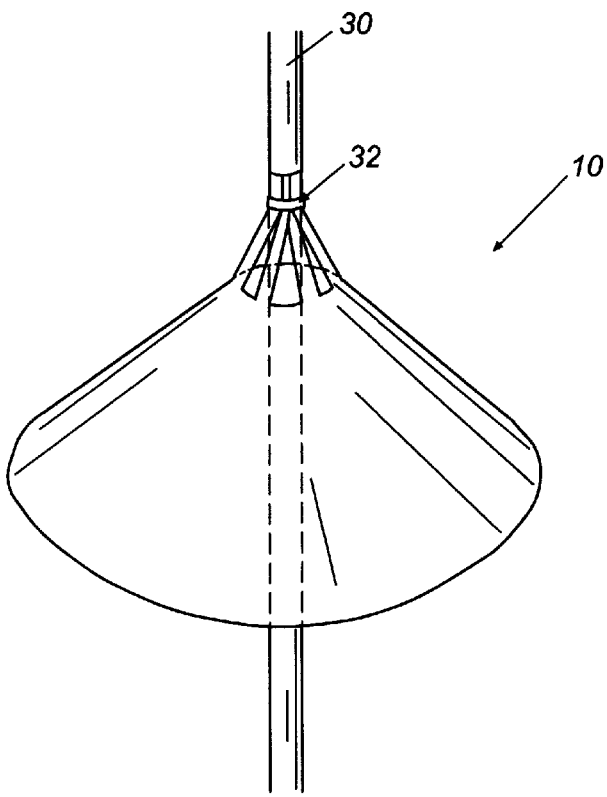
FIG. 5 shows the squirrel shield of FIG. 4 secured to the pole by a first strap.

As shown in FIGS. 3 and 4, during installation of the shield 10, the fingers 22 are aligned upward against the outer surface of the pole 30, the bending amount of the fingers depending on the diameter of the pole 30. For larger diameters, the fingers 22 will bend up an amount more than when installed on poles 30 having a smaller diameter. A first strap 32 then is fastened around the outside surfaces of fingers 22 to securely hold the shield 10 in place against pole 30, as illustrated in FIG. 5. The portion of fingers 22 extending past strap 32 are then bent downward over strap 32 and a second strap 34 is tied around fingers 22 to securely hold shield 10 in place, as shown in FIG. 6. Once placed on the pole or tree, a climbing animal will find it nearly impossible to climb up and over shield 10 as shield 10 provides no convenient surface upon which the animal can grasp to continue upward. The apertures 28 in the center assembly 20 between fingers 22 are too small for squirrels and the like to pass through.

FIG. 7 is a similar view to FIG. 6, except that pole 30 has the diameter of pole 30 in FIG. 3, wherein fingers 22 extend along the outer surface of pole 30 from inner edge 15 of shield 10.

While the invention has been described in its preferred form, alternative embodiments exists, including the use only of a first strap 32 to hold shield 10 releasably secured to pole 30. Further, squirrel shield 10 can be installed around pole 30 as a conical member extending from inner edge 15 upward pole 30 to outer edge 14.

According to another embodiment of shield 10, side edges 16, 18 can be fastened together not by holes 24, 26 and fastening means such as bolts or screws, but by a fastening means comprising crimping, stapling or gluing side edges 16, 18 to one another. Alternatively, side edges 16, 18 can comprise hook portions providing hooked side edges 16, 18 as shown in FIG. 8, wherein edges 16, 18 are fastened by hooking one edge to the other.

While the invention has been disclosed in its preferred forms, it will be apparent to those skilled in the art that many modifications, additions, and deletions can be made therein without departing from the spirit and scope of the invention and its equivalents as set forth in the following claims.

What is claimed is:

1. A device to prevent varmints from ascending poles and trees, said device comprising:
    (a) a flat sheet having an inner and outer surface, inner and outer edges and first and second side edges extending between said outer edge and said inner edge; and
    (b) a center assembly comprising fingers having tips across substantially the entire length of said inner edge, said fingers extending from said inner edge of said sheet to the tip of said fingers,
    said sheet having an arcuate shape of between a quarter-circle and a half-circle.

2. The device of claim 1, wherein said inner and outer edges have constant radii of curvature.

3. The device of claim 2, wherein said first and second side edges are normal to said inner and outer edges.

4. The device of claim 3, wherein said fingers are integral with said flat sheet.

5. The device of claim 4, wherein said fingers are spaced apart from each other in regular integrals.

6. The device of claim 5, wherein said flat sheet comprises a flexible material.

7. The device of claim 6, wherein said center assembly comprises a bendable material.

8. The device of claim 7, wherein said flexible material comprises plastic.

9. The device of claim 8, wherein holes are provided in proximity to said first and second side edges.

10. The device of claims 8, wherein said first and second side edges comprise hook portions.

11. A method of preventing varmints from ascending poles and trees, said method comprising the steps of:
    (a) providing a flexible sheet having an inner and outer surface, inner and outer edges, first and second side edges extending between said inner and outer edges, and a center assembly incorporating fingers having tips, said fingers being located across substantially the entire length of said inner edge and extending from said inner edge to the tip of said fingers;
    (b) wrapping said sheet around the outer surface of the pole wherein a portion of the inner surface of each said finger contacts the outer surface of the pole;
    (c) fastening said first edge of said sheet to said second edge; and
    (d) securing a portion of said fingers to the pole.

12. The method according to claim 11, wherein said step of securing a portion of said fingers to the pole comprises the following substeps:
    (a) securing a portion of said fingers to the pole by a first securing means;
    (b) folding the portion of said fingers extending upward beyond said first securing means downward over said first securing means; and
    (c) securing the folded-over portions of said fingers to said pole by a second securing means.

13. The method according to claim 12, wherein said first securing means comprises a first strap.

14. The method according to claim 13, wherein said second securing means comprises a second strap.

15. A method of preventing varmints from ascending poles and trees, said method comprising the steps of:
    (a) providing a flexible sheet having an inner and outer surface, inner and outer edges, first and second side edges extending between said inner and outer edges, and a center assembly incorporating fingers having tips, said fingers extending from said inner edge to the tip of said fingers;
    (b) wrapping said sheet around the outer surface of the pole wherein a portion of the inner surface of each said finger contacts the outer surface of the pole;
    (c) fastening said first edge of said sheet to said second edge; and
    (d) securing a portion of said fingers to the pole by a first securing means;
    (e) folding the portion of said fingers extending upward beyond said first securing means downward over said first securing means; and (f) securing the folded-over portions of said fingers to said pole by a second securing means.

16. The method according to claim 15, wherein said first and second securing means comprise first and second straps, respectively.

17. The method according to claim 16, wherein holes are provided in proximity to said first and second side edges.

18. The method according to claim 16, wherein said first and second side edges comprise hook portions.

19. The method according to claim 17, wherein said step of fastening said first edge of said sheet to said second edge comprises fastening said first edge to said second edge through said holes.

20. The method according to claim 18, wherein said step of fastening said first edge of said sheet to said second edge comprises fastening said first edge to said second edge by hooking said hook portion of said first edge to said hook portion of said second edge.

* * * * *